United States Patent [19]

Feld

[11] Patent Number: 4,792,151

[45] Date of Patent: Dec. 20, 1988

[54] SELF-ALIGNING, SELF-LOCKING AND SELF-LEVELING TRAILER HITCH ASSEMBLY

[76] Inventor: Sam H. Feld, 616 Riverside Dr., West Richland, Wash. 99352

[21] Appl. No.: 84,828

[22] Filed: Aug. 13, 1987

[51] Int. Cl.$^4$ .......................... B62D 53/00; B60D 1/06
[52] U.S. Cl. ................................ 280/406 A; 280/477; 280/490 R; 280/509
[58] Field of Search ........... 280/406 A, 446 R, 446 B, 280/477, 478 B, 490 B, 508, 509, 510, 511, 512, 513

[56] References Cited

U.S. PATENT DOCUMENTS

| | | | |
|---|---|---|---|
| 1,233,849 | 7/1917 | Culhane | 280/509 |
| 2,151,181 | 3/1939 | Appell | 280/509 |
| 2,481,461 | 9/1949 | Wolfrum | 280/508 |
| 2,546,206 | 3/1951 | Arehart | 280/406 A |
| 3,552,771 | 1/1971 | Hendricks | 280/406 A |
| 3,556,558 | 1/1971 | McKee | 280/406 A |
| 3,588,145 | 6/1971 | Thompson | 280/446 B X |
| 3,600,004 | 8/1971 | Newkirk | 280/406 A |
| 3,759,549 | 9/1973 | Morris | 280/512 |
| 3,801,133 | 4/1974 | Thompson | 280/406 A |
| 3,879,061 | 4/1975 | Thompson | 280/406 A X |
| 4,042,256 | 8/1977 | Lepp | 280/512 |
| 4,049,288 | 9/1977 | Young | 280/406 A |
| 4,198,073 | 4/1980 | Olsen | 280/406 A |
| 4,215,876 | 8/1980 | Jacks | 280/490 R X |
| 4,560,184 | 12/1985 | Williams, Jr. | 280/478 B |
| 4,606,549 | 8/1986 | Williams, Jr. | 280/478 B |
| 4,613,149 | 9/1986 | Williams, Jr. | 280/508 |

OTHER PUBLICATIONS

Penor Drawing No. B-1-1195.
Penor Drawing No. A-3-1202.
Penor Drawing No. A-3-1191.
Gliderite Brochure entitled "Automatic, Self-Aligning Trailer Hitch"(undated).
Brochure entitled "Tow-Chief . . . The Easy Way".
OG p. 1672, dated Apr. 22, 1972, showing issuance of Thompson U.S. Pat. No. 3,879,061.
OG p. 1653, dated Jun. 28, 1971, showing issuance of Thompson U.S. Pat. No. 3,588,145.
OG p. 220, dated Apr. 2, 1974, showing issuance of Thompson U.S. Pat. No. 3,801,133.

*Primary Examiner*—John J. Love
*Assistant Examiner*—Mitchell J. Hill
*Attorney, Agent, or Firm*—Graybeal, Jensen & Puntigam

[57] ABSTRACT

A trailer hitch comprising a housing mountable on the vehicle, a ramp sloping downwardly and rearwardly from the housing away from the vehicle, and two laterally opposed pivotable jaws having recesses which when closed define a socket or pocket in which the ball coupling of the trailer tongue is retained. The ramp slopes downwardly at about 30°, and flares from a narrow neck to a wider lip, and has upstanding side curbs. The jaws pivot horizontally about vertical axes through jaw supports outboard of the housing. The jaws automatically close around the ball as it is moved forwardly along the channel into the socket. Aligned holes in interfitting locking arms of the jaws receive and are locked together and to the housing by a locking pin which drops into place when the jaws are completely closed. A load leveler distributes the trailer's weight between the wheels of the towing vehicle using a V-shaped rod detachably connected at its apex to a pivotable link below the housing. The link pivots about the vertical axis through the center of the ball. The ends of the rod are adjustably attached to a cross beam spanning between the side beams of the trailer tongue.

18 Claims, 3 Drawing Sheets

SELF-ALIGNING, SELF-LOCKING AND SELF-LEVELING TRAILER HITCH ASSEMBLY

BACKGROUND OF THE INVENTION

1. Technical Field

This invention relates to trailer hitches for hitching a wheeled trailer behind a towing vehicle. More particularly, it relates to hitches which automatically align and lock the trailer to the hitch, and which distribute the unbalanced weight of the trailer between forward and rearward wheels of the towing vehicle.

2. Description of the Prior Art

Conventional ball and socket type trailer hitches are in common use for towing trailers behind passenger and light utility vehicles. The conventional ball type trailer hitch comprises a downwardly opening, substantially spherical cavity or socket at the distal end of the front tongue of the trailer, and an interfitting upstanding spherical ball rigidly supported on and spaced rearwardly from the rear of the towing vehicle. When the ball is secured within the cavity in the tongue of the trailer, the trailer can be towed behind the vehicle.

The process of coupling a trailer and towing vehicle using a conventional ball and socket type trailer hitch is relatively complicated, and usually requires two people. First, the trailer's tongue must be raised above the level of the vehicle's ball. This is typically accomplished using a support jack mounted on the tongue. Next, the vehicle must be maneuvered into position with the ball directly below the cavity of the tongue. This procedure typically requires one person to operate the vehicle and another to direct the vehicle operator to maneuver the vehicle in one direction or the other until the ball is in position. Once the ball is positioned properly, the trailer's tongue is lowered, again using the support jack, until the cavity encloses the ball and the entire load on the tongue is carried by the vehicle. Finally, a safety mechanism is engaged to securely lock the ball within the cavity. It will be appreciated that the process described above can be quite time-consuming, even when performed by two experienced persons. When attempted by a single person, the process of coupling a trailer to a towing vehicle via a conventional ball and socket type trailer hitch is extremely difficult, if possible at all.

A major disadvantage of the ball and socket type trailer hitch is that it transmits only axial forces between the towing vehicle and the trailer. The ball and socket is not capable of transmitting rotational moments. This deficiency causes the trailer hitch to sag downwardly if the front end of the trailer is overloaded, thereby overloading the rearward wheels of the towing vehicle. Several designs have been offered to overcome this deficiency in the ball and socket hitch by creating a moment bearing connection through the hitch. These prior art devices commonly add one or more members connecting between the trailer tongue at a point rearwardly of the socket and the support for the ball at a point vertically downwardly from the ball. These additional members transmit axial forces or rotational moments to the ball support, thereby allowing the hitch to transmit rotational moments around a transverse horizontal axis between the vehicle and the trailer. A major disadvantage of these prior art weight distributing hitches is that each time the trailer is hitched to the towing vehicle, the additional members which distribute the unbalanced weight of the trailer to the forward and rearward wheels of the vehicle must be securely attached to the ball support, and then adjusted until the unbalanced weight is distributed properly.

SUMMARY OF THE INVENTION

It is an object of the present invention to provide a trailer hitch which automatically guides a coupling element of a trailer into the correct position and alignment for securement to the hitch.

It is another object of this invention to provide a trailer hitch which automatically locks the coupling element of the trailer into the hitch when properly positioned therein.

It is yet another object of this invention to provide a self-aligning and self-locking trailer hitch which is readily adapted to use with a conventional, spherically socketed trailer tongue and a conventional hitch support on the vehicle.

It is a further object of this invention to provide a trailer hitch which distributes the unbalanced load on the trailer tongue between forward and rearward wheels of towing vehicle, and which is readily connected between the hitch and the trailer.

It is yet another object of this invention to provide a weight distributing trailer hitch which accommodates conventional trailer support jack mounted on the tongue immediately rearwardly of the socket thereof.

These and other objects are provided by a hitch comprising a housing mountable on the vehicle, a ramp for slidably engaging a downwardly extending coupling element of the trailer, two laterally opposed jaws pivotally mounted on the housing, means for automatically closing the jaws around the coupling element, and means for automatically locking the closed jaws. The ramp is affixed ton the housing, and slopes downwardly and rearwardly from the housing away from the vehicle. The ramp flares from a narrower neck proximate the housing to a distal lip at least about twice as wide as the neck. The ramp has means for guiding the coupling element. The pivotably mounted jaws move horizontally about laterally spaced, substantially vertical axes. The jaws have opposed recesses which together define a socket or pocket forwardly of the neck of the ramp. The hitch's socket snugly receives the coupling element of the trailer when the jaws are closed. The means for automatically closing the jaws is responsive to movement of the coupling element into the socket between the jaws.

The above objects are further provided by a load leveler comprising a link pivotably mounted below the horizontal axis of movement of the trailer relative to the hitch, and a tensile member sloping upwardly between the link and the trailer. A proximal end of the link is horizontally pivotable substantially around the vertical axis of movement of the trailer relative to the hitch. A first end of the tensile member is removably attachable ton the distal end of the link.

Other features and advantages of this invention will become apparent from the following detailed description of typical embodiments thereof, taken in conjunction with the accompanying drawings.

DETAILED DESCRIPTION OF THE PREFERRED EMBODIMENTS

The present invention comprises a trailer hitch 20 mountable on a conventional hitch support 10 rigidly attached ton the vehicle (not shown). The hitch 20 receives and securely retains a double ball type coupling element 21 having a lower ball 22 and an upper ball 23 adapted to be held within a downwardly opening spherical cavity or socket 12 in the trailer's tongue 14 by a lock 17. A load leveler 24 slopes upwardly and rearwardly from hitch 20 at either side of the trailer support jack 16 on the tongue 14.

Figure 1:
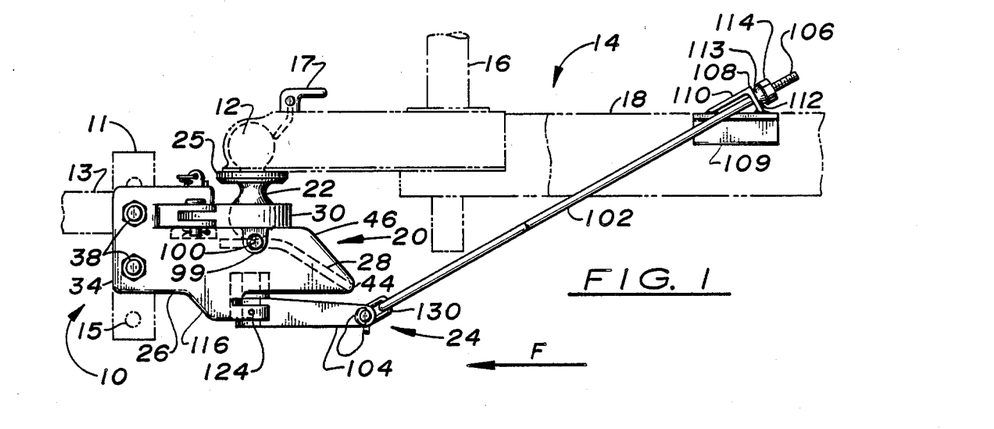
FIG. 1 is a side elevational view of a trailer hitch and load leveler according to the present invention, with the trailer's tongue partially broken away to show further detail.

As shown in FIG. 1, the hitch support 10 includes a vertical bar 11 of substantially rectangular cross section. The bar 11 is affixed perpendicularly to a second bar 13 which extends horizontally in a forward direction F beneath the vehicle (not shown) and is rigidly attached to the undercarriage of the vehicle. The vertical bar 11 is pierced through by horizontal holes 15 spaced regularly along the vertical length of the bar. The hitch 20 is adjustably attachable to the vehicle by these holes 15.

Figure 2:
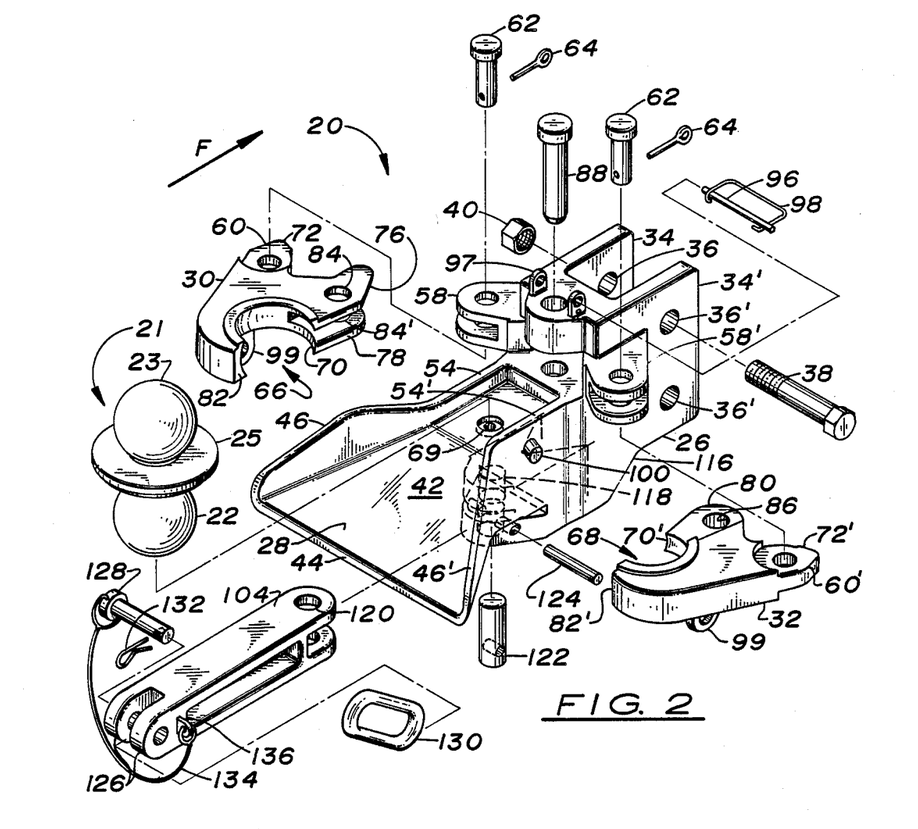
FIG. 2 is an exploded detailed isometric view of the trailer hitch of FIG. 1, showing the housing, the jaws and the double ball coupling element.

Referring now to FIG. 2, the hitch 20 comprises a housing 26, a ramp 28 affixed to and extending downwardly from the housing, and first and second jaws 30, 32 pivotably mounted on the housing. The housing 26 includes forwardly projecting vertical mounting plates 34, 34' for mounting the housing on the vertical bar 11 of the hitch support 10. The mounting plates 34, 34' are sized to snugly receive the vertical bar 11 of the hitch support 10 between them. Each of the mounting plates 34, 34' includes two vertically aligned horizontal holes 36, 36' for removably attaching the hitch 20 to the vertical bar 11 of the hitch support 10. The hitch mounting holes 36, 36' in each mounting plate 34, 34' are spaced apart vertically by a distance equal to the spacing of the corresponding holes 15 in the vertical bar 11 of the hitch support 10. The mounting holes 36, 36' in each of the mounting plates 34, 34' are aligned with the mounting holes of the other mounting plate.

The hitch 20 is mounted on the hitch support 10 by positioning the hitch so that the vertical bar 11 of the hitch support 10 is located between the mounting plates 34, 34' with the mounting holes 36, 36' of the hitch 20 aligned with adjacent holes 15 of the vertical bar. A threaded steel bolt 38 is then inserted through each of the mounting holes 36, 36' and the holes 15, and the hitch 20 is securely attached to the hitch support 10 by a steel nut 40 threaded onto the bolt 38 and tightened against the mounting plate 34. The hitch 20 may be selectively mounted at any one of several different levels on the vertical bar 11 of the hitch support 10 by aligning the mounting holes 36, 36' of the hitch with selected higher or lower pairs of holes 15 in the vertical bar 11.

When mounted on the hitch support 10, the hitch 20 extends horizontally and rearwardly from the vehicle toward the tongue 14 of the trailer (not shown). The housing 26 is located adjacent the hitch support 10, and the ramp 28 extends from the housing away from the hitch support and the vehicle rearwardly toward the trailer. The ramp engages and guides the lower ball 22 of the coupling element 21, which extends downwardly from the cavity 12 of the trailer tongue 14, into position between the jaws 30, 32 of the hitch 20 as the vehicle and hitch are maneuvered toward the trailer, the trailer being supported on the trailer jack 16. The double ball coupling element 21 includes a circular plate 25 coaxial with and spaced between the upper and lower balls 23, 22. The plate 25 engages the rim of the lower opening of the spherical cavity 12 at the end of the trailer's tongue 14, and prevents rotation of the coupling element 21 around either horizontal axis with respect ton the trailer tongue 14. The plate 25 may be welded or bolted to the rim of the lower opening of the tongue's cavity 12 to positively prevent rotation of the coupling element 21 around either horizontal axis with respect to the tongue 14. The plate 25 thus ensures that the trailer will move with respect to the hitch 20 only about the horizontal and vertical axes through the center of the lower ball 22 of the coupling element 21.

The ramp 28 slopes downwardly and rearwardly from the housing 26 away from the vehicle. The ramp 28 flares from a narrower neck portion 42 proximate the housing 26 to a wider distal lip 44. The lip 44 is at least about twice as wide as the neck 42 of the ramp, and is preferably about four times as wide as the neck. The width of the neck is preferably about 90% of the diameter of the lower ball 22 of the coupling element. The angle of the downwardly sloping ramp 28 is preferably about 30° below the horizontal. The ramp 28 is provided with upstanding curbs 46, 46' along its side edges for guiding the coupling element 21 up the ramp. The curbs 46, 46' rise gradually higher above the surface of the ramp 28. At the neck 42 adjacent the housing 26, the curbs 46, 46' extend about ½ inch above the level of the ramp. Adjacent the lip 44, the curbs 46, 46' are substantially level with the surface of the ramp 28. Between the neck 42 and the lip 44, the curbs 46, 46' reach a maximum height of 1½ inches vertically above the surface of the ramp 28 at about 40% of the distance from the neck to the lip, tapering sharply downwardly from that point to the lip. The upstanding curbs 46, 46' cooperate to positively guide the lower ball 22 up the ramp 28 and into position between the jaws 30, 32 as the vehicle with the hitch 20 mounted thereon is maneuvered rearwardly toward the trailer.

The ramp 28 must withstand large forces as the lower ball 22 initially contacts and subsequently rides up the ramp. The present invention strengthens the ramp 28 with downwardly extending sidewalls 48, 48'. The sidewalls 48, 48' are downward extensions of the curbs 46, 46', being parallel to and equally as thick as the curbs. The lower edges of the sidewalls 48, 48' extend horizontally forwardly from the lower edge of the lip 42 to the housing 26. The sidewalls 48, 48' thus provide additional stiffness supporting the ramp 28 against the impact of the coupling element 21.

The housing 26 includes a channel 50 along which the lower ball 22 slides from the neck 42 of the ramp 28 into position between the jaws 30, 32. The channel 50 includes a horizontal plate 52 and upstanding curbs 54, 54'. The channel plate 52 is coincident with the ramp 28 at the neck 42, and extends horizontally and forwardly from the neck toward the vehicle. The channel curbs 54, 54' are essentially forward extensions of the ramp curbs 46, 46', rising about ½ inch above the upper surface of the channel plate 52 along the entire length of the channel 50. The channel 50 extends forwardly well beyond the position in which the lower ball 22 is held between the jaws 30, 32. Like the ramp 28, the channel plate 52 is stiffened and supported by sidewalls 56, 56'. The channel sidewalls 56, 56' extend downwardly from the channel plate 52. The lower edges of the channel sidewalls 56, 56' are at the same level as the lower edges of the ramp sidewalls 48, 48'. The channel sidewalls 56, 56' extend directly forwardly from the ends of the ramp sidewalls 48, 48' below the neck 42. The channel curbs 54, 54' and sidewalls 56, 56' thus respectively meet the ramp curbs 46, 46' and sidewalls 48, 48' along vertical lines at either side of the neck 42.

Figure 3:
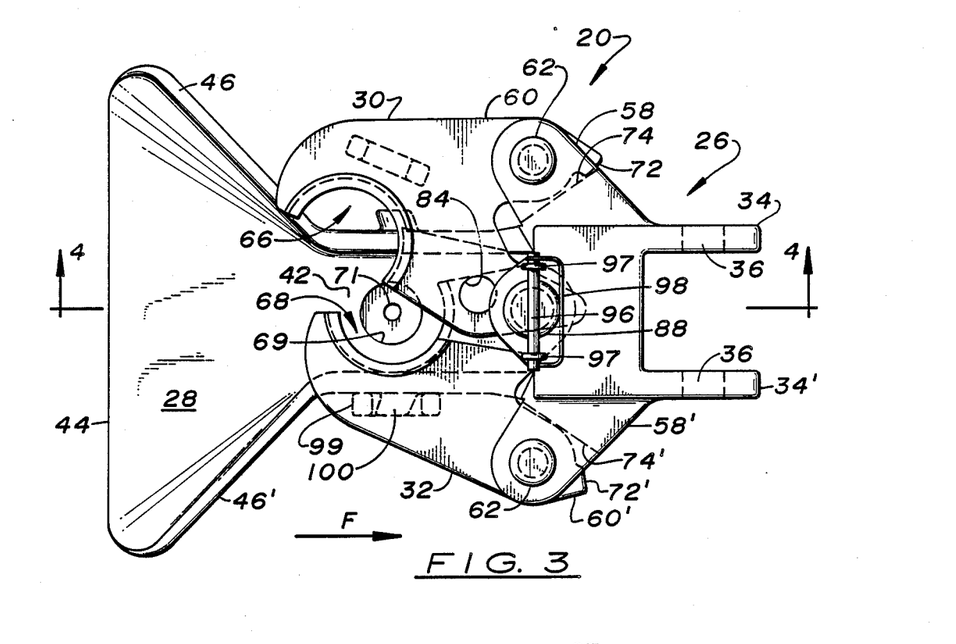
FIG. 3 is a top plan view of the trailer hitch of FIG. 2, with one jaw shown in the open position and the other jaw shown in the closed position.
Figure 4:
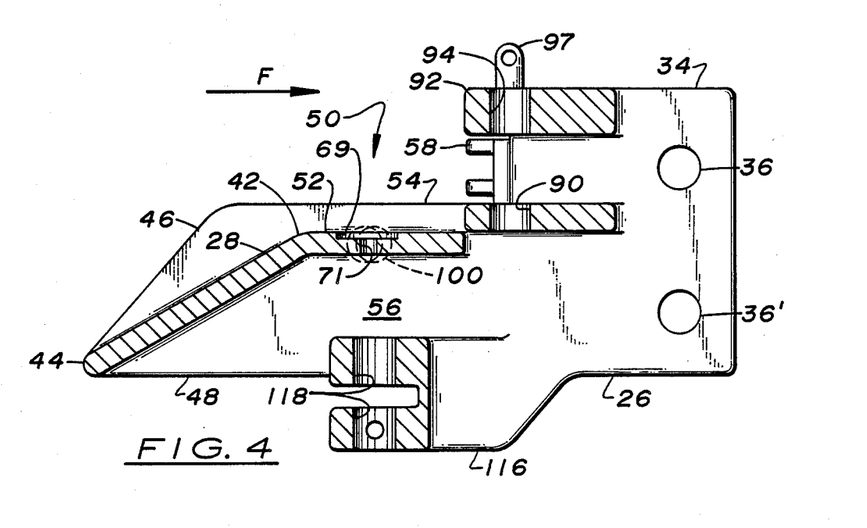
FIG. 4 is an elevational cross-sectional view of the trailer hitch, taken along line 4—4 of FIG. 3.

When the vehicle has been maneuvered to slide the lower ball 22 up the ramp 28 and forwardly along the channel 50, the lower ball is automatically locked between the locked jaws 30, 32 to hitch the trailer to the vehicle. The jaws 30, 32 are pivotally mounted on the housing 26 for horizontal movement about vertical axes. As best seen in FIGS. 2 and 3, the jaws 30, 32 are pivotally mounted on respective jaw supports 58, 58'. Each of the jaw supports 58, 58' comprises two parallel flanges extending horizontally outwardly and rearwardly from the vertical sides of the housing 26. The parallel flanges of each jaw support 58, 58' are spaced apart to receive an interfitting hinge portion 60, 60' of the respective jaw 30, 32. The flanges of each jaw support 58, 58' and the hinge portion 60, 60' of each jaw 30, 32 are pierced by aligned holes for receiving a hinge pin 62. When the jaws 30, 32 are placed with their hinge portion 60, 60' in their respective jaw supports, 58, 58', and the hinge pins 62 are placed through the aligned holes of the jaw supports and hinge portions, the jaws 30, 32 are pivotably mounted for horizontal movement around vertical axes spaced outwardly from the sides of the housing 26. The hinge pins 62 are prevented from falling out of the jaw supports 58, 58' by enlarged diameter heads at the upper ends of the hinge pins. The hinge pins 62 are prevented from lifting upwardly out of the jaw supports 58, 58' by removable cotter pins 64 extending through transverse holes in the lower ends of the hinge pins 62. The cotter pins 64 are spaced slightly below the lower flanges of the jaw supports 58, 58', the hinge pins 62 being of suitable length for this purpose.

The jaws 30, 32 extend horizontally and substantially rearwardly from their jaw supports 58, 58'. Because the jaw supports 58, 58' are located immediately behind (forwardly of) the forward end of the channel 50 of the housing 26, the jaws 30, 32 extend rearwardly outboard of either side of the channel. The jaws 30, 32 are spaced above the channel 50 to securely receive the mid-portion of the lower ball 22, and are sized so that their lower horizontal surfaces are spaced closely above the upper edges of the channel curbs 54, 54'. If the ball 22 is a 2.312 inch sphere and the channel curbs 54, 54' rise about 0.5 inch above the upper surface of the channel 50, then the center of the ball will be about 0.656 inch above the upper edge of the curbs. To provide adequate clearance, lower surfaces of the jaws 30, 32 are spaced about 0.13 inch above the upper edges of the channel curbs 54, 54', and the center of the ball 22 is thus located about 0.526 inch above the lower surfaces of the jaws. The upper surfaces of the jaws 30, 32 are raised slightly where they adjoin the ball 22 so that the thickness of the jaws vertically between their upper and lower surfaces adjoining the ball is about 1.13 inch.

Recesses 66, 68 are provided in the jaws 30, 32 for receiving the lower ball 22. When the jaws 30, 32 are closed, with their distal ends in proximal contact with each other, the recesses 66, 68 together form a frustospherical socket or pocket between the jaws. The center of the socket defined by the recesses 66, 68 is at the same level above the surface of the channel plate 52 as the center of the spherical lower ball 22. The diameter of the spherical socket is equal to the diameter of the lower ball 22. Thus, when the lower ball 22 is positioned in the socket defined by the recesses 66, 68, it is snugly received and retained between the jaws when they are closed.

A cylindrical recess 69 is provided in the upper surface of the channel plate 52 in order to seat the lower ball 22 in the socket defined by the recesses 66, 68. The channel plate's recess 69 is about 1.0 inch in diameter and about 0.12 inch deep, and is aligned vertically with the center of the socket defined by the recesses 66, 68. A vertical hole 71 extends from the center of the channel plate's recess 69 downwardly through the channel plate 52. The center of the socket defined by the jaw recesses 66, 68 and the recess 69 in the channel plate 52 are located about 1.25 inches forwardly along the center of the channel 50 from the rearward end of the channel 50, or about 40% of the distance from the rearward end of the channel toward the forward end thereof.

The hitch 20 of this invention includes means for automatically closing the jaws 30, 32 around the lower ball 22 responsive to movement of the lower ball inton the cavity defined by the recesses 66, 68 in the jaws. This automatic closing means is provided by the forward corners 70, 70' of the recesses 66, 68 of the jaws 30, 32 in cooperation with jaw stops 72, 72'. When the jaws 30, 32 are open, with their recesses 66, 68 separated from each other, the forward corners 70, 70' of the recesses are located above the channel, each being about one-third the distance from the longitudinal centerline of the channel toward the channel curb 54, 54' beneath the respective jaw 30, 32. The jaws 30, 32 are prevented from opening beyond this open position by stops 72, 72' extending substantially forwardly from the hinge portions 60, 60' of the jaws. The stops 72, 72' engage respective stop blocks 74, 74' between the flanges of the jaw supports 58, 58' when the jaws 30, 32 are in their open positions, preventing further opening of the jaws and thus ensuring that the forward corners 70, 70' of the recesses 66, 68 are positioned at their respective third points across the width of the channel 50 when the jaws are open.

The jaws 30, 32 are automatically closed as the lower ball 22 moves forwardly along the channel 50 into the position of the socket defined by the recesses 66, 68 in the jaws 30, 32. After the lower ball 22 engages the forward corners 70, 70' of the recesses 66, 68 in the jaws 30, 32, further forward movement of the ball requires that the forward corners move forwardly with the ball. This in turn requires the jaws 30, 32 to pivot horizontally toward each other about the vertical axes of the hinge pins 62. This pivoting of the jaws 30, 32 closes them around the lower ball 22.

The jaws 30, 32 interfit with each other forwardly of the forward corners 70, 70' of the recesses 66, 68 in order for the jaws to fully encircle the ball 22. The portion of the first jaw 30 forwardly of its forward corner 70 comprises upper and lower spaced apart flanges 76, 78. The portion of the second jaw 32 forwardly of its forward corner 70' comprises a single central flange 80 sized to snugly fit between the upper and lower flanges 76, 78 of the first jaw 32. Thus, as the jaws 30, 32 are automatically closed by forward movement of the lower ball 22 against the forward corners 70, 70' of the recesses 66, 68, the interfitting flanges 76, 78 and 80 of the jaws 30 and 32 slide together to allow the jaws to fully close against each other and snugly receive the ball 22 in their recesses 70, 70'. When so closed, the distal rearward ends 82, 82' of the jaws 30, 32 abut each other to encircle and secure the rearward portion of the ball 22. The forward corners 70 of the upper and lower flanges 76, 78 of the first jaw 30 abut the upper and lower vertical faces of the second jaw 32 along the proximal edge of the central flange 80 of the second jaw 32, thus enclosing the forward portion of the ball 22 when the jaws are closed. It will therefore be seen that when closed, the jaws 30, 32 fully encircle and retain the ball 22 in the cavity defined by their recesses 70, 70'.

The closed jaws 30, 32 are locked around the ball 22 automatically, greatly simplifying the process of hitching the trailer to the towing vehicle. The automatic locking means pins interfitting locking arms of the jaws to each other, and further pins these interfitted locking arms to the housing 26. Thus pinned, the jaws 30, 32 are prevented from opening and releasing the ball 22. The locking arm of the first jaw 30 comprises its upper and lower flanges 76, 78 which are pierced by aligned vertical holes 84, 84'. The locking arm of the second jaw comprises its central flange 80 which is similarly pierced by a hole 86. This locking hole 86 of the second jaw 32 is aligned vertically with the locking holes 84, 84' of the first jaw 30 when the jaws are closed against each other.

A locking pin 88 is dropped through the aligned holes of the flanges 76, 78, 80 comprising the locking arms of the first and second jaws 30, 32 to lock the closed jaws. The locking pin 88 extends downwardly through the lower flange 78 and is snugly received in a vertical hole 90 in the body of the housing 26. The hole 90 is formed in a flat plate element extending transversely between and cast integrally with the side walls of the housing 26. The upper portion of the locking pin 88 above the upper flange 76 of the first jaw 30 is retained within and supported by a support flange 92 extending horizontally and rearwardly from the body of the housing 26. The support flange 92 is pierced by a vertical hole 94 which snugly receives the locking pin 88.

Similarly to the hinge pins 62, the locking pin 88 is prevented from falling downwardly out of position by an enlarged diameter upper head, and is prevented from lifting upwardly by a relatively small diameter retaining pin 96 extending horizontally and transversely immediately above the enlarged head of the locking pin 88. The ends of the retaining pin 96 are received through horizontal holes in upstanding retaining flanges 97 spaced transversely at either side of the enlarged head of the locking pin 88. A spring pin 98 prevents the retaining pin 96 from sliding out from the retaining flanges 97.

The locking pin 88 automatically falls through the aligned holes of the jaws 30, 32 into the hole 90 of the housing 26 when the jaws reach the closed position. While the first jaw 30 is open to any degree, the locking pin 88 is retained within the hole 94 in the support flange 92, with the lower end of the locking pin 88 contacting the upper surface of the upper flange 76 of the first jaw 30. The upper flange 76 of the first jaw 30 for this reason extends forwardly a sufficient distance to ensure that it contacts and supports the locking pin 88 throughout the entire range of motion of the first jaw 30 as limited by its stop 72 and stop blocks 74. When the first jaw 30 reaches its fully closed position, the hole 84 in the first jaw's upper flange 76 is aligned below the locking pin 88, causing the locking pin to drop into the hole. Because the automatic closing means provided by the forward corners 70, 70' of the recesses 66, 68 causes both jaws 30, 32 to close together around the ball 22, the locking pin 88 drops not only through the upper hole 84 in the upper flange 76, but also through the vertical hole in the central flange 80 of the second jaw 32 and through the hole 84' in the lower flange 78 of the first jaw 30, and finally into the hole 90 in the body of the housing 26. In this position, the locking pin 88 securely pins and locks the flanges or locking arms of the jaws 30, 32 to each other, and further to the housing 26, thereby securely locking the jaws around the ball 22.

The jaws 30, 32 are braced against the upward load of the trailer, in order that the entire upward load is not carried by the jaw supports 58, 58' and the support flange 92 of the jaws. Each jaw comprises a downwardly extending U-shaped shear brace 99 which fits around a horizontally and slightly rearwardly extending shear stud 100 affixed to either side wall 56, 56'. As the jaws 30, 32 close, their respective shear braces 99 slip over the corresponding shear studs 100. The shear braces 99 proximally contact the channel side walls 56, 56' when the jaws 30, 32 are closed.

The hitch 20 is used to hitch the trailer to the towing vehicle as follows. The trailer tongue 14 is supported on the trailer jack 16. The upper ball 23 of the double ball coupling element 21 is secured within the spherical cavity 12 at the distal end of the tongue 14, by the lock 17, with the lower ball 22 of the double ball extending downwardly below the tongue. The trailer support jack 16 is adjusted so that the level of the lower ball is slightly above the level of the lip 44 of the ramp 28 of the hitch 20. The hitch 20 is prepared to receive the coupling element 21 by opening the jaws 30, 32. First the retaining pin 96 is removed from above the locking pin 88, and the locking pin is lifted upwardly out of the holes through the flanges 76, 78, 80 of the jaws 30, 32. The jaws 30, 32 are then manually opened to the extent permitted by the stops 72, 72' and stop blocks 74, 74', with the lower end of the locking pin 88 being supported on the forwardly extending upper flange 76 of the first jaw 30. With the jaws thus opened, the towing vehicle is maneuvered rearwardly toward the trailer until the ramp 28 contacts and engages the lower ball 22. The vehicle is then driven further rearwardly toward the trailer, sliding the ball 22 up the ramp 28 to the neck 42 thereof, and thence forwardly along the channel 50. As described above, when the ball 22 contacts the forward corners 70, 70' of the jaws 30, 32, the jaws begin to close around the ball. Further rearward movement of the towing vehicle completely closes the jaws 30, 32 around the ball 22, at which point the hinge pin 88 in the support flange 92 falls freely through the aligned holes in the flanges or locking arms of the jaws 30, 32 and inton the hole in the housing 26, automatically locking the closed jaws around the ball. The retaining pin 96 is then manually replaced through the retaining flanges 97 above the head of the locking pin 88, and the spring pin 98 is manipulated to keep the retaining pin in place. The trailer is now fully and securely hitched ton the towing vehicle, and the support jack 16 can be released, placing the full weight of the trailer tongue 14 on the vehicle.

Figure 5:
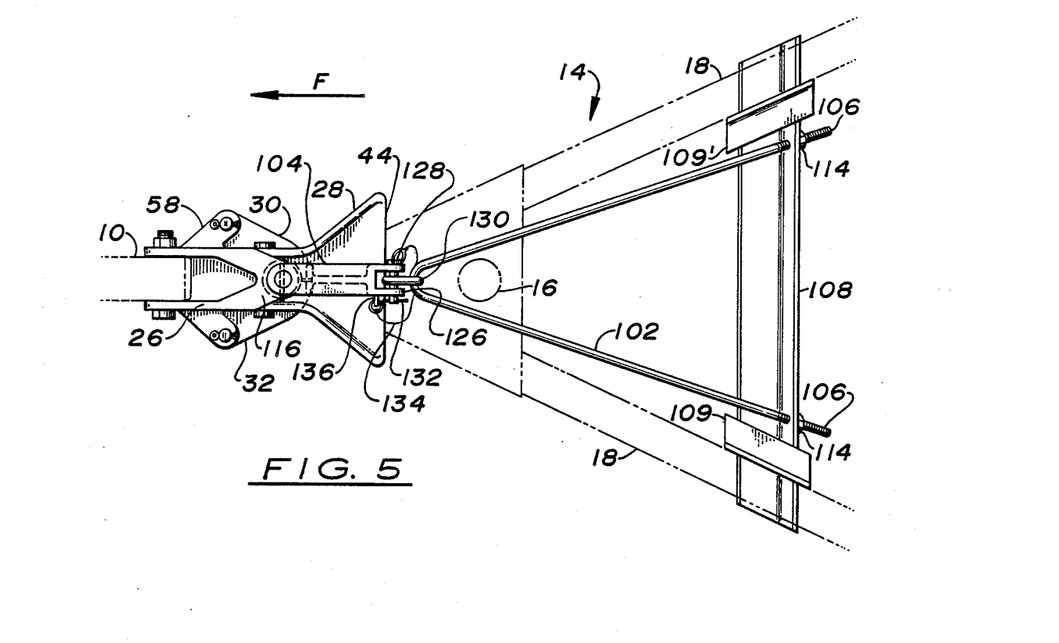
FIG. 5 is a bottom plan view of the trailer hitch and load leveler of FIG. 1, showing the pivotable link and the V-shaped tensile member.

The present invention also provides a load leveler 24 for distributing the weight of the trailer tongue 14 between forward and rearward wheels of the towing vehicle. As best seen in FIGS. 1 and 5, the load leveler 24 comprises a V-shaped rod 102, a linking bar 104 pivotally mounted below the housing 26, and means for removably connecting the linking bar to the rod. The ends 106 of the rod 102 are adjustably attached to a cross bar 108 spanning between the side beams 18 of the trailer tongue 14. The cross bar 108 is an L-shaped member rigidly attached to two angles 109, 109' which fit the inside surfaces of the side beams 18. The cross bar 108 is inverted and oriented with the wider plate 110 of the cross bar 108 closer to the socketed end of the tongue 14. The wider and narrower plates 110, 112 of the L-shaped cross bar 108 are oriented so that the shorter plate 112 is substantially perpendicular to the rod 102, using metal wedges inserted between the cross bar 108 and the angles 109, 109'. The ends of the rod 106 extend through holes in the narrower plate 112 and are retained against its upper surface by spherical sliding washers 113 and adjustment nuts 114. The adjustment nuts 114 allow the rod 102 to be shortened or lengthened relative to the position of the cross beam 108. The V-shaped rod 101 accommodates the trailer support jack 16, which is positioned centrally between the side beams 18 of the tongue 14 and which would interfere with a single tensile member extending directly rearwardly from the distal end of the link 104.

The link 104 has a proximal end 116 pivotably mounted on the bottom of the housing 26. The proximal end of the link 104 comprises upper and lower flanges which interfit with and are pivotably mounted on a rearwardly extending link support 116 at the bottom of the housing 26. The link support 116 itself comprises upper and lower flanges which are spaced apart by a distance equal to the thickness of the upper flange of the proximal end of the link 104. The lower flange of the link support 116 is of a thickness to snugly interfit between the upper and lower flanges of the proximal end of the link 104. Aligned vertical holes 118 extend through the upper and lower flanges of the link support 116. Similarly sized holes 120 extend through the upper and lower flanges of the proximal end of the link 104. A link pivot pin 122 extends through and pivotably mounts the proximal end of the link 104 on the link support 116 of the housing 26. A spring lock pin 124 extends through transverse holes in the lower flange of the link support 116 and in the lower end of the link pivot pin 122 to prevent the link pivot pin from falling or lifting out of position. The axis of the link pivot pin 122 is vertically aligned with the center of the lower ball 22 of the coupling element 21. This ensures that when the towing vehicle turns and the trailer moves horizontally around the center of the ball 22 relative to the hitch 20, the link 104 of the load leveler 24 also allows the trailer to pivot about the same axis.

From the link support 116, the link 104 extends rearwardly and horizontally below the ramp 28 of the hitch 20 to a distal end which is connectable ton the apex of the V-shaped rod 102. The distal end of the link 104 comprises first and second vertical flanges 126 spaced apart by a predetermined distance. Between the proximal and distal ends, the link 104 has an I-shaped cross section with upper and lower horizontal flanges and a central vertical web. The vertical flanges 126 at the distal end of the link 104 are provided with aligned horizontal holes for receiving a connecting pin 128. The link 104 tapers vertically from a slightly thicker proximal end to a thinner distal end. This provides suitable clearance between the distal end of the link 104 and the lip 44 of the ramp 28.

The apex of the V-shaped rod 102 is connected ton the distal end of the link 104 by the connecting pin 128 and a closed steel loop or chain link 130. One end of the loop 130 is retained between the vertical flanges 126 at the distal end of the link 104 by the connecting pin 128. The opposite end of the loop 130 is looped around the apex of the V-shaped rod 102, being initially slipped over one of the ends 106 of the rod before the rod is inserted through the holes in the narrower plate 112 of the cross bar 108 between the side beams 18 of the trailer tongue 14. The V-shaped rod 102 is detachably connected ton the distal end of the link 104 by fitting the free end of the loop 130 between the vertical flanges 126 at the distal end of the link 104, and inserting the connecting pin 128 through the holes in the flanges 126 and through the middle of the loop 130. The connecting pin 128, like the hinge pin 62, is retained in position by an enlarged diameter head at one end of the connecting pin, and a cotter pin 132 extending through the opposite end of the connecting pin adjacent the outer surface of one of the flanges 126. A retaining cord 134 is attached to the head of the connecting pin 128, and at the other end to an anchor tab 136. The anchor tab 136 is a thin vertical member extending outwardly from one of the vertical flanges 126 at the distal end of the link 104.

After the hitch 20 has been engaged to securely hitch the trailer to the towing vehicle, the load leveler 24 is connected to distribute the weight on the tongue 14 of the trailer between the forward and rearward wheels of the towing vehicle. This is accomplished by raising the connected hitch 20 and trailer tongue 14 with the trailer jack 16 in order to connect the V-shaped rod 102 to the link 104 as described above. Any necessary adjustments to the position of the rod 102 are made by adjusting the adjustment nuts 114 at the ends 106 of the rod to obtain the desired level position. Such adjustments are generally necessary but once, since the effective length of the rod 102 between the narrower plate 112 of the cross beam 108 and the distal end of the link 104 required to evenly distribute the weight on the tongue 14 between the forward and rearward wheels of the towing vehicle is the same for any given loading of the vehicle and trailer.

When the load leveler 24 is connected between the hitch 20 and the trailer 14, a tensile force is developed in the rod 102. The vertical spacing between the link and the horizontal axis of movement of trailer relative to the hitch 20 through the center of the ball 22 converts tension developed in the rod 102 into a rotational moment applied to the hitch about a transverse horizontal axis through the hitch. This rotational moment, transmitted to the towing vehicle by the hitch support 10, forces the forward wheels of the vehicle downwardly and thereby distributes a portion of the weight of the trailer tongue 14 from the rearward wheels to the forward wheels of the towing vehicle.

It will be appreciated that, although specific embodiments of the invention have been described herein for purposes of illustration, various modifications may be made without departing from the spirit and scope of the invention. For example, the rod 102 might be replaced by any tensile member, such as a chain or cable. Similarly, the spherical lower ball 22 of the coupling element 21 might be replaced by another geometric shape such as a rectangle or diamond, with the recesses 66, 68 in the jaws 30, 32 and the socket defined thereby being suitably reconfigured. The cross member 108 may be replaced by fittings permanently attached to the side beams 18 at any suitable location.

I claim:

1. A trailer hitch for hitching a trailer having a downwardly extending coupling element to a towing vehicle, the hitch comprising:
  a housing;
  means for mounting the housing on the vehicle;
  a ramp for slidably engaging the coupling element of the trailer, the ramp being affixed to the housing and sloping downwardly and rearwardly from the housing away from the vehicle, the ramp flaring from a narrower neck proximate the housing to a distal lip at least about twice as wide as the neck, the ramp having means for guiding the coupling elements;
  two laterally opposed jaws pivotally mounted on the housing for horizontal movement about substantially vertical axes, the jaws having opposing recesses which together define a socket forwardly of the neck of the ramp for snugly receiving the coupling element of the trailer when the jaws are closed and the jaws further comprising locking arms with holes which are vertically aligned when the jaws are closed;
  means for automatically closing the jaws around the coupling element responsive to movement of the coupling element into the socket between the jaws; and
  pin means cooperating with said holes in the jaws for automatically locking the jaws around the coupling element by downward vertical movement responsive to gravity as the jaws become closed.

2. A trailer hitch according to claim 1, wherein said housing comprises a vertical hole in vertical axial alignment with the vertical holes in the jaws when the jaws are closed, and into which said pin means falls on the occurrence of the downward movement of the pin means, to automatically lock the position of the closed jaws relative ton the housing.

3. A trailer hitch according to claim 1, wherein the coupling element comprises a double ball having an upper ball removably securable within a spherical cavity of a tongue of the trailer, and a lower ball for engaging the hitch.

4. A trailer hitch according to claim 1, wherein the automatic closing means comprises forward corners of the recesses of the jaws, said corners being located to be engaged by the coupling element as the coupling element is moved inton the socket.

5. A trailer hitch according to claim 4, wherein the jaws include stops for engaging and stopping the jaws from opening beyond a selected open position in which the forward corners of the recesses of the jaws are located to be engaged by the coupling element.

6. A trailer hitch according to claim 1, wherein the automatic locking means comprises:
  a locking arm affixed to each jaw and extending toward the opposite jaw, each locking arm having interfitting distal portions with vertical locking holes extending therethrough, the locking holes being vertically aligned with each other when the jaws are closed;
  a locking pin downwardly receivable within the aligned locking holes; and
  means for supporting the locking pin above one of the jaws when the jaws are open, and allowing the locking pin to fall into the aligned locking holes when the jaws are closed.

7. A trailer hitch according to claim 5, wherein the automatic locking means further comprises removable means for retaining the locking pin in jaw locking position in the holes.

8. A trailer hitch according to claim 5, wherein the automatic locking means further comprises a support flange affixed ton the housing for supporting an upper end of the locking pin when the jaws are not closed, and wherein the housing includes a socket for receiving the lower end of the locking pin.

9. A trailer hitch according to claim 1, wherein the jaws are pivotably mounted on jaw supports extending outwardly from the housing so that the vertical pivot axes of the jaws are spaced outboardly from the housing.

10. A trailer hitch according to claim 1, wherein the jaws further have depending shear braces which when the jaws are closed interfit around shear studs extending outwardly from the housing.

11. A trailer hitch according to claim 1, wherein the coupling element guiding means of the ramp comprises upstanding curbs along the ramp's side edges.

12. A trailer hitch according to claim 1, further comprising means for leveling the load on forward and rearward wheels of the towing vehicle.

13. A trailer hitch according to claim 12, wherein the load leveling means comprises a link having a proximal end pivotally mounted at the bottom of the hitch and the distal end spaced horizontally toward the trailer, the proximal end of the link being horizontally pivotal around the vertical axis of movement of the trailer relative to the hitch, the link being below the coupling element; and
  a tensile member having a first end removably attachable to the distal end of the link, sloping therefrom away from the hitch upwardly to a second end attached to the trailer, and acting in tension to distribute the trailer load to the front and rear wheels of the towing vehicle.

14. A load leveler for use with a hitch for hitching a trailer to a towing vehicle, the leveler comprising:
  a link having a proximal end pivotally mounted on the hitch and a distal end spaced toward the trailer, the proximal end of the link being horizontally pivotal substantially around the vertical axis of movement of the trailer relative to the hitch, the link being below the horizontal axis of movement of the trailer relative to the hitch; and
  a tensile member having a first end removably attachable to the distal end of the link therefrom upwardly to a second end attached to the trailer, and acting in tension to distribute the trailer load to the front and rear wheels of the towing vehicle.

15. A load leveler according to claim 14, wherein the tensile member comprises V-shaped rod means.

16. A load leveler according to claim 15, wherein the ends of the v-shaped rod means are adjustably attached to a cross bar between side beams of the trailer.

17. A load leveler according to claim 14, wherein the second end of the tensile member is adjustably attached to the trailer as a means for varying the load distribution.

18. A load leveler according to claim 14, wherein the trailer has a downwardly extending coupling element, and wherein the hitch comprises a housing mountable on the vehicle; a ramp for slidably engaging the coupling element of the trailer, the ramp being affixed to the housing and extending downwardly from the housing away from the vehicle, the ramp flaring from a narrower neck proximate the housing to a distal lip at least about twice as wide as the neck; and means for securely receiving and retaining the coupling element of the trailer forward of the neck of the ramp.

* * * * *